(No Model.)
J. BRISCOE.
RELIEF VALVE.
No. 337,236. Patented Mar. 2, 1886.
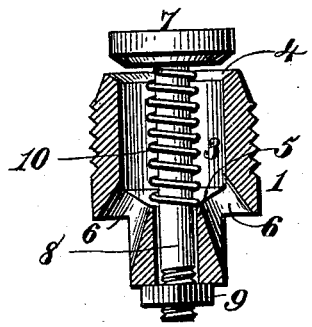
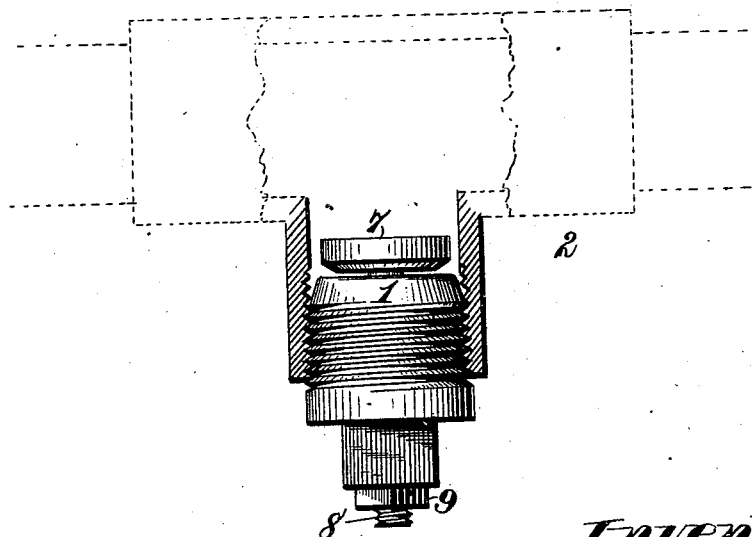
Witnesses.
Inventor.
John Briscoe.
By James L. Norris.
Atty.

UNITED STATES PATENT OFFICE.

JOHN BRISCOE, OF BOLIVAR, NEW YORK.

RELIEF-VALVE.

SPECIFICATION forming part of Letters Patent No. 337,236, dated March 2, 1886.

Application filed October 16, 1884. Serial No. 145,691. (No model.)

*To all whom it may concern:*

Be it known that I, JOHN BRISCOE, a citizen of the United States, residing at Bolivar, Allegany county, New York, have invented new and useful Improvements in Relief-Valves, of which the following is a specification.

My invention relates to that class of valves generally termed "relief-valves;" and the purpose is to provide an automatic attachment for gas, water, and steam pipes and steam-engines, wherein the valve shall be closed by the pressure within the pipe and opened the instant such pressure is removed, thereby affording a discharge-aperture for the gas, vapor, or liquid contained within said pipe.

To this end my invention consists in the several novel features of construction and combinations of parts hereinafter fully set forth, and definitely pointed out in the claims.

Referring to the drawings forming part of this application, Figure 1 is a central-vertical section, and Fig. 2 is an elevation showing the valve attached.

In the said drawings the reference-numeral 1 denotes the plug, within which the valve is arranged. This plug has a male thread cut upon its periphery, whereby it is tapped into the water, steam, or gas pipe 2, to which it may be attached. Within the plug 1 is formed a chamber, 3, and upon its lower end a valve-seat, 4. Upon the upper end thereof is formed a bridge, 5, having a central perforation to receive the valve-stem, and upon opposite sides of the said bridge are formed outlets 6, communicating with the chamber 3.

The lower end of the chambered plug is closed by a valve, 7, carried by a valve-stem, 8, which projects through the perforation in the bridge 5, and receives upon its threaded end a nut, 9. Upon the valve-stem 8 is coiled a spring, 10, the ends whereof bear against the valve 7 and the bridge 5, normally throwing the valve from its seat.

In operation, the plug 1 is tapped into any pipe, whether gas, steam, or water, wherein a pressure is exerted by the substance of which the pipe is a vehicle. This pressure closes the valve 7, which remains in engagement with its seat as long as the pressure continues. The moment it is cut off the tension of the spring 10 throws the valve open and allows the escape of the fluid or gas remaining in the pipe.

This invention is intended not only for the drainage of pipes conveying water to prevent freezing after the water is cut off at the main, but also to take the place of petcocks in steam-engines, wherein condensation takes place upon the first introduction of steam.

It will readily be seen that the condensed vapor will be at once discharged, as the valve will only close after sufficient pressure is generated throughout the line of pipe to overcome the tension of the spring by which the valve is thrown from its seat.

In engines which require to be started and stopped at short intervals this relief-valve prevents flooding with water while the engine is standing.

It will be seen that by adjusting the nut upon the end of the valve-stem the throw of the spring may be varied to suit the circumstances of each case.

These valves may be applied where it has heretofore been customary to insert the solid drain-plugs tapped into a T placed in the line at any suitable point or points.

Having thus described my invention, what I claim is—

1. In a relief-valve, the combination of a valve-chamber adapted to be tapped and secured into any part of a gas, water, or steam pipe, a valve, a valve-stem passing through and projecting outside the valve-chamber, a spring acting upon the valve, and means for adjusting the resilience of such spring located upon the exterior of the chamber, substantially as described.

2. A relief-valve for pipes or tubes, consisting of a chamber, adapted to be tapped into and secured to a pipe, and provided with outlets, a valve seated therein, a stem secured to the valve and projecting through and outside of the chamber, a spring seated within the chamber for normally holding the valve open, and a nut upon the stem outside of the chamber for adjusting the resilience of the spring, substantially as described.

In testimony whereof I affix my signature in presence of two witnesses.

JOHN BRISCOE.

Witnesses:
E. R. KILBERRY,
D. J. STEWART.